(12) United States Patent
Kitagawa

(10) Patent No.: US 6,283,529 B2
(45) Date of Patent: Sep. 4, 2001

(54) FOOTREST FOR VEHICLE

(75) Inventor: Yuichi Kitagawa, Yokosuka (JP)

(73) Assignee: Nissan Motor Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/730,602

(22) Filed: Dec. 7, 2000

(30) Foreign Application Priority Data

Dec. 8, 1999 (JP) .................................................. 11-349452

(51) Int. Cl.$^7$ ........................................................ B60N 3/06
(52) U.S. Cl. ............................................. 296/75; 296/189
(58) Field of Search ..................................... 296/75, 189

(56) References Cited

U.S. PATENT DOCUMENTS

| | | | | |
|---|---|---|---|---|
| 2,654,420 | * | 10/1953 | Rogers ................................... | 296/75 |
| 2,994,365 | * | 8/1961 | Ziegler ................................... | 296/75 |
| 3,860,284 | * | 1/1975 | Lichtig ................................... | 296/75 |
| 4,726,438 | * | 2/1988 | Stuertz et al. ........................ | 296/75 |
| 4,984,838 | * | 1/1991 | Kim ....................................... | 296/75 |
| 5,183,308 | * | 2/1993 | Koga et al. ............................ | 296/75 |
| 6,102,466 | * | 8/2000 | Kanazawa et al. ................... | 296/75 |

FOREIGN PATENT DOCUMENTS

| | | |
|---|---|---|
| 9-183332 | 7/1997 | (JP) . |
| 10-310011 | 11/1998 | (JP) . |
| 11-20533 | 1/1999 | (JP) . |

* cited by examiner

*Primary Examiner*—D. Glenn Dayoan
*Assistant Examiner*—G Blankenship
(74) *Attorney, Agent, or Firm*—McDermott, Will & Emery

(57) ABSTRACT

A footrest is provided to restrain a passenger's ankle from bending backward at a vehicle front collision. When a toe board 2b is deformed toward a passenger's room at the vehicle front collision, then a frame member 7 forming an energy absorbing unit 5 for the footrest 3 begins to be deformed on compression. In the member's deformation, a front-inclined leg part 9F of the member 7 on the side of the passenger's toe yields ahead of others firstly. Thus, the compressive deformation is successively transmitted from the frame member's part on the side of the passenger's toe to the same part on the side of the passenger's heel frame member 7, so that collision energy can be absorbed to moderate an impact exerted on the passenger's foot F. Additionally, since the foot F is moved obliquely upward of the toe board 2b by the prior deformation of the part 9F, it is possible to restrain the passenger's ankle from bending backward.

17 Claims, 17 Drawing Sheets

FOOTREST FOR VEHICLE

BACKGROUND OF THE INVENTION

The present invention relates to a footrest for a vehicle.

Japanese Patent Unexamined Publication (kokai) No. 11-20533 discloses a footrest fixed on a sidewall at a front passenger's foot and positioned apart from a toe board on the underside of a dash panel, Japanese Patent Unexamined Publication (kokai) No. 9-183332 a footrest arranged on the toe board on the underside of the dash panel 20533 and provided with a weakened part to reduce a moment acting on the passenger's ankle with the deformation of the toe board toward a passengers ' room when the vehicle collides on its front side, and Japanese Patent Unexamined Publication (kokai) No. 10-310011 discloses a footrest which springs the passenger's heel by means of an actuator thereby to forcibly separate the heel from the toe board at the vehicle front collision.

Although all of the above-mentioned footrests are commonly directed to protect the passenger's feet against the deformation of the toe board toward the passenger's room at the vehicle front collision, there are desired more effective improvements for lightening various loads exerted on the passenger's ankle, as possible.

SUMMARY OF THE INVENTION

Under the above circumstance, it is an object of the present invention to provide a footrest for a vehicle, which is capable of moderating an impact applied on the whole sole from a passenger's toe to the heel when the toe board is deformed toward the passengers' room by the vehicle front collision and which can restrain the passenger's ankle from cambering or bending backward to protect the passenger's foot effectively.

According to the invention, the above-mentioned object is accomplished by a footrest arranged on a toe board which is formed on an underside of a dash panel of a vehicle fixed permanently to a floor panel of the vehicle, the footrest has; at a position between a footrest pedal surface for resting a passenger's foot thereon and the toe board, an energy absorbing unit which can be compressively deformed to absorb a collision energy when the toe board is deformed toward a passenger's room at a vehicle front collision; and a footrest moving mechanism for moving the passenger's foot lying on the footrest pedal surface, obliquely upward of the toe board simultaneously with the absorption of the collision energy by the energy absorbing unit.

BRIEF DESCRIPTION OF THE DRAWINGS

FIG. 1A shows the first example of the arrangement and FIG. 1A shows the second example of the arrangement;

FIG. 6A shows a condition before the unit is deformed and FIG. 6B shows a condition after the unit is deformed;

FIG. 7A shows a condition before the footrest is deformed and FIG. 7B shows a condition after the footrest is deformed;

FIG. 8A shows a case of no footrest, FIG. 8B a case of adopting a footrest having an energy absorbing function, and FIGS. 8C and 8D show respective cases of adopting the footrest of the first embodiment of the invention;

FIG. 22A shows a condition before the footrest is deformed and FIG. 22B shows a condition after the footrest is deformed;

DESCRIPTION OF THE PREFERRED EMBODIMENT

Referring to accompanying drawings, various embodiments of the present invention will be described below.

Figure 1A:
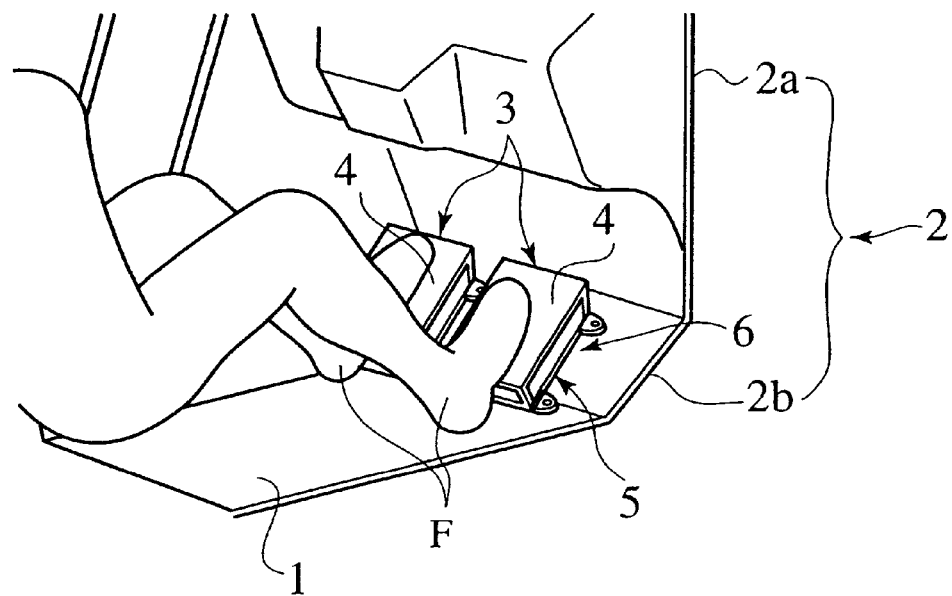
FIGS. 1A and 1B are explanatory views showing two forms of the footrest of the present invention schematically.
Figure 1B:
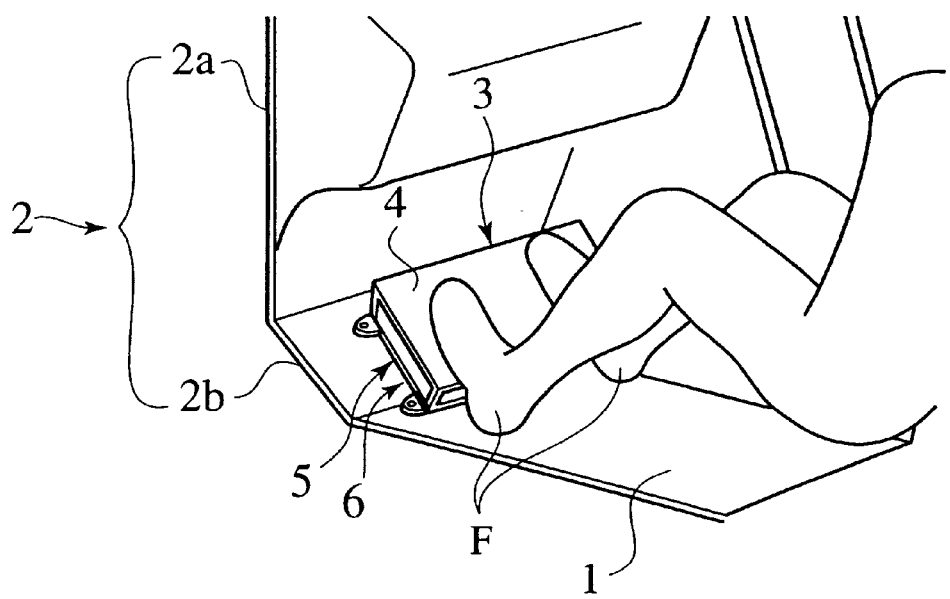

FIGS. 1A and 1B show two arrangement forms of the footrest of the present invention. For ease to understand the essence of the invention, each figure illustrates a front passenger's foot space viewed obliquely from behind while eliminating a front door, various pedals, etc. which would be arranged in a vehicle generally.

In common with FIGS. 1A and 1B, the front passenger's foot space is defined by a floor panel 1 and a dash panel 2. The dash panel 2 separates an engine room from a passenger's room. In general, the floor panel 1 is arranged to extend horizontally. While, the dash panel 2 includes a vertical wall 2a formed to stand almost perpendicularly and a toe board 2b formed on the underside of the wall 2a to stoop and also connected to the above floor panel 1. Owing to the provision of the toe board 2b being stooped, when the passenger sinks into a front seat, then the passenger's feet F can be laid on the toe board 2b with the passenger's natural posture.

According to the embodiment, one or more footrests 3 are arranged on the toe board 2b inclining forward. In one example of FIG. 1A, two footrests 3, 3 are arranged on the toe board 2b, each having a footrest pedal surface 4 of an area enough for the passenger's left or right foot F. In the other example of FIG. 1B, the only footrest 3 is arranged on the toe board 2b to have the footrest pedal surface 4 of its width and area allowing the left and right feet F to be mounted thereon simultaneously.

Therefore, it should be noted that both of the examples shown in FIGS. 1A and 1B are provided for an assistant driver allowing his (her) left and right feet F to be mounted on the footrest pedal surface(s) 4. For a driver, the single (small-sized) footrest 3 shown in FIG. 1A is appropriate for a footrest for the driver.

In common with the examples of FIGS. 1A and 1B, each footrest 3 has an energy absorbing unit 5 and a footrest moving mechanism 6 both arranged between the footrest pedal surface 4 and the toe board 2b. In operation, when the toe board 2b is deformed toward the passenger's room by the vehicle front collision, the energy absorbing unit 5 operates to absorb the collision energy due to its compressive deformation. While, under the same situation, the footrest moving mechanism 6 operates to move the passenger's foot F mounted on the footrest pedal surface 4 obliquely upward of the toe board 2b.

Figure 2:
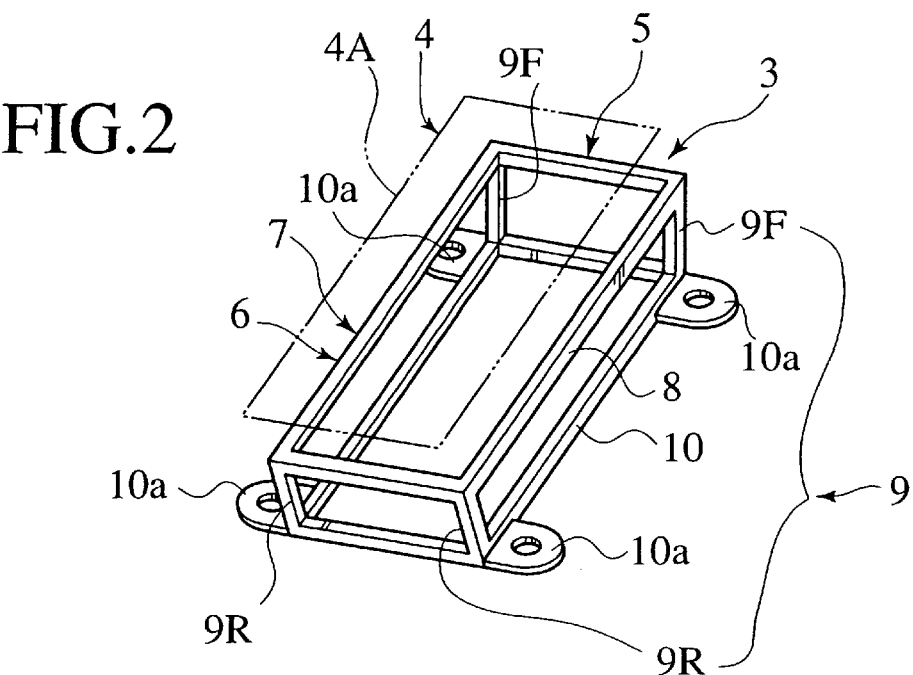
FIG. 2 is a perspective view of an energy absorbing unit of the first embodiment of the invention.
Figure 3:
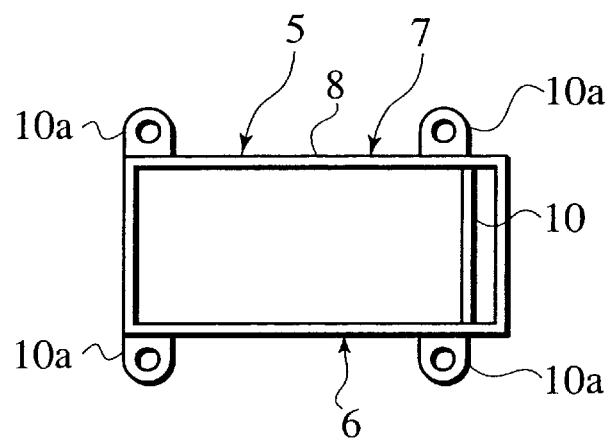
FIG. 3 is a plan view of the energy absorbing unit of FIG. 2.
Figure 4:
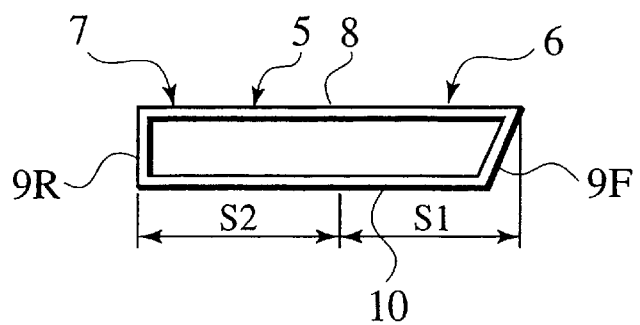
FIG. 4 is a side view of the energy absorbing unit of FIG. 2.

FIGS. 2 to 4 show the energy absorbing unit 5 shown in FIG. 1A. Note that the large-sized footrest 3 shown in FIG. 1B has an energy absorbing unit similar to the shown energy absorbing unit 5 except a dimension of width.

The footrest pedal surface 4 is provided by a flat plate 4A which is oblong in plan view. The energy absorbing unit 5 includes a frame member 7 having a frame part 8 forming a peripheral framework of the footrest pedal surface 4 and being oblong in plan view and leg parts 9 (9F, 9R) extending from four corners of the frame part 8 toward the toe board 2b. Note that the energy absorbing unit 5 is not always provided with the frame part 8. For example, when the footrest pedal surface 4 is formed with a sufficient rigidity, then the leg parts 9 may be welded to the respective corners of the footrest pedal surface 4 directly.

In the shown embodiment, the frame member 7 further includes another frame part 10 connecting respective lower ends of four leg parts 9 with each other.

On both sides of the frame part 10, respective mount seats 10a are formed to extend laterally in the vicinities of the leg parts 9F on the toe's side and likewise the leg parts 9R on the heel's side. Through the respective mount seats 10a, the frame member 7 can be fixed on the toe board 2b by appropriate fastening members, such as bolts and nuts.

In order to allow the compressive deformation of the frame member 7 to be started from the toe's side of the footrest pedal surface 4, the frame member 7 has a soft area $S_1$ established on the toe's side of the member 7 and a hard area $S_2$ established on the heel's side, so that the frame member 7 per se forms the footrest moving mechanism 6 in this embodiment.

The establishment of the above-mentioned soft area $S_1$ and hard area $S_2$ may be accomplished by adjusting the property of a material forming the toe's side of the frame member 7, the dimension of thickness of the same material, the sectional profile of the same material, etc. According to the embodiment, the leg parts 9R on the heel's side are formed generally perpendicularly to the toe board 2b to provide a rigid structure against the compression load, while the leg parts 9F on the toe's side are inclined forward at predetermined angles to facilitate their collapsing forward for providing a soft structure against the compression load. Owing to such the establishment of the soft and hard structures, the frame member 7 can be provided with the footrest moving mechanism 6 allowing the compressive deformation to be initiated from the toe's side of the frame member 7.

Figure 5:
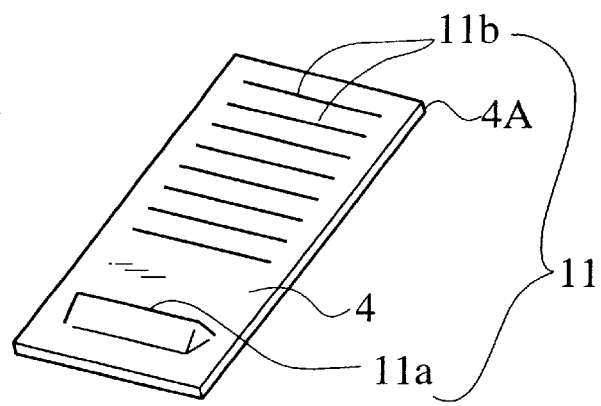
FIG. 5 is a perspective view showing a surface of the footrest of the first embodiment.

Upon the establishment of rigidity that would not cause the flat plate 4A to be deformed by the passenger's stepping action, the flat plate 4A is welded to the upper frame part 8 of the frame member 7. As shown in FIG. 5, the flat plate 4A has a nonskid mechanism 11, for example, a projection 11a and grooves 11b formed on the footrest pedal surface 4, preventing the passenger's foot F from slipping on the surface 4.

According to the embodiment, when the toe board 2b is deformed toward the passenger's room by the vehicle front collision, the collision energy is absorbed by the compressive deformation of the energy absorbing unit 5 between the footrest pedal surface 4 and the toe board 2b of the footrest 3. Consequently, it is possible to moderate the impact acting on the whole passenger's sole extending from the toe of the passenger's foot F mounted on the footrest pedal surface 4 up to the heel.

Conventionally, the deformation of the toe board 2b toward the passenger's room used to cause a tendency for the passenger's ankle to bend backward since the above deformation was accompanied with the backward pivot of the toe board 2b about its joint with the floor panel 1 while the passenger's legs were folded with an unavoidable forward displacement of the passenger's hips due to their inertia. According to the embodiment, the passenger's foot F on the footrest pedal surface 4 is moved obliquely upward of the toe board 2b by the footrest moving mechanism 6, at the same time of the collision energy absorbing action by the energy absorbing unit 5. Therefore, it is possible to restrain the passenger's ankle from bending backward, so that the passenger's foot can be mitigated from impact on the sole certainly.

Owing to the using of the frame member 7 as the energy absorbing unit 5 of the embodiment, it is possible to control the property of absorbing the energy at will by appropriately selecting the properties of materials for the frame parts 8, 10 and the leg parts 9 forming the frame member 7, the dimension of thickness of the same materials, the sectional profiles of the same materials, etc. Further, the structure of the footrest can be simplified by the adoption of the frame member 7. Thus, it is possible to provide the footrest 3 having the energy absorbing property corresponding to the requirements easily and advantageously in manufacturing cost.

Additionally, even if there is produced a local deformation in the toe board 2b (part) corresponding to the footrest 3, in detail, a board's part inside of the frame part 10 of the frame member 7, the local deformation can be absorbed by a space among the frame part 10, the leg parts 9 and the frame part 8.

Further, since the frame member 7 is divided into the soft area $S_1$ on the toe's side and the hard area $S_2$ on the heel's side in order to provide the footrest moving mechanism 6, there is no need to supply the footrest 3 with any exclusive component for the mechanism 6, so that the advantageous footrest 3 in cost can be provided without being large-sized and also increasing the number of components and the weight.

Again, since the footrest pedal surface 4 is provided with the nonskid mechanism 11, the footrest moving mechanism 6 allows the foot F to be moved together with the footrest pedal surface 4 certainly while the foot F is being prevented from slipping on the surface 4.

Figure 6A:
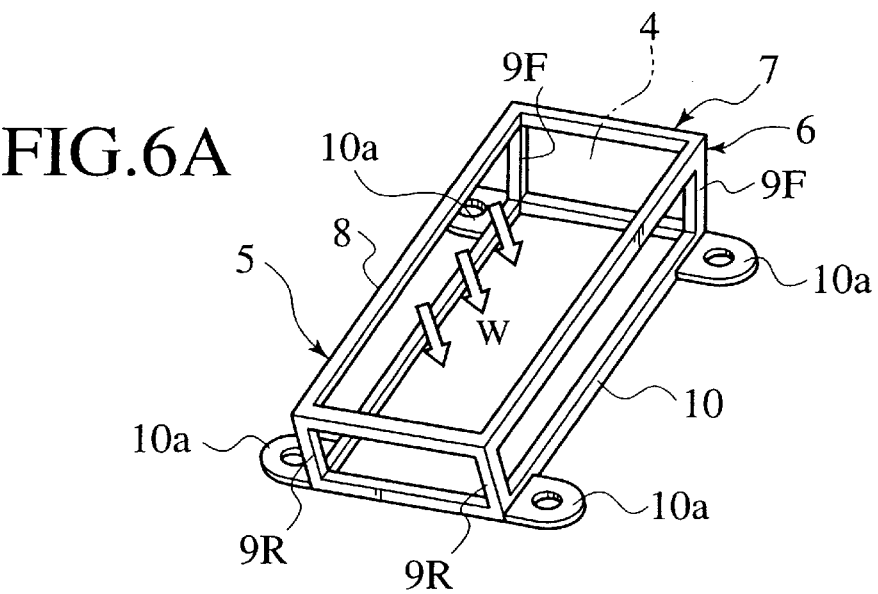
FIGS. 6A and 6B are explanatory views of the operation of the energy absorbing unit of the first embodiment of the invention.
Figure 6B:
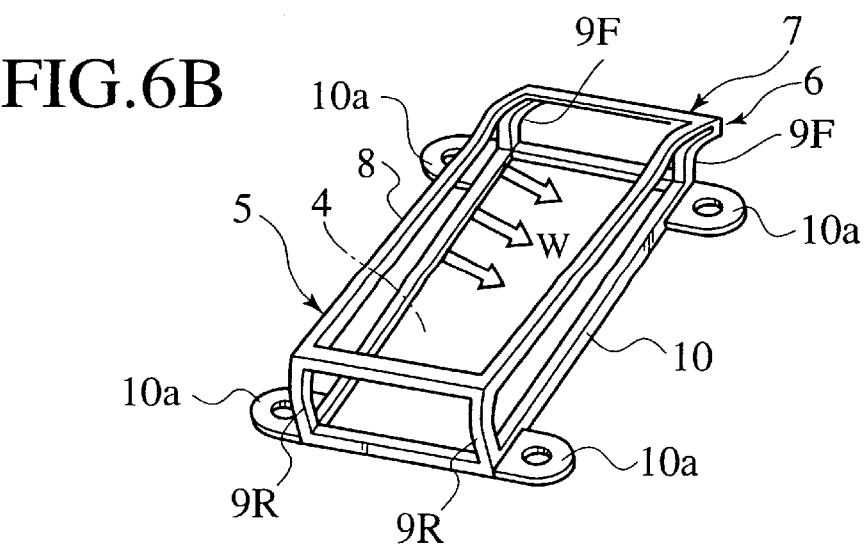

FIGS. 6A and 6B show the process of compressive deformation of the frame member 7. In the figures, FIG. 6A illustrates a condition before the member 7 is deformed, while FIG. 6B illustrates the sequent condition after the member 7 has been deformed. In FIGS. 6A and 6B, arrows W designate respective directions of loads transmitted from the foot F to the frame member 7 via the footrest pedal surface 4.

As described before, since the toe board 2b is deformed toward the passenger's room with the deformation of an engine compartment at the vehicle front collision while the passenger's hips are moving forward by the inertia, the loads are applied on the footrest 3 through both of its upper and lower surfaces.

For easiness of the explanation, while standardizing the lower surface of the footrest 3 as a datum level, these figures illustrate the conditions that the frame member 7 is being deformed compressively.

Therefore, the loads shown with the arrows W is equal to a resultant force consisting of a compressive force derived from the above deformation of the toe board 2b toward the passenger's room and an inertia inputted from the passenger's foot F. Note that the inertia may include the passenger's stepping force according to circumstances.

Unless the load exerted on the footrest pedal surface 4 exceeds a predetermined value, the frame member 7 maintains its original configuration as shown in FIG. 6A. While, if the load exceeds the predetermined value, then the frame member 7 is compressively deformed (buckled) as shown in FIG. 6B.

This compressive deformation of the frame member 7 mainly comes from the buckling of the leg parts 9. As mentioned before, since the leg parts 9F on the toe's side of the passenger are inclined forward at the predetermined angles in the embodiment, the front leg parts 9F are buckled forward earlier than the other leg parts 9R on the heel's side of the passenger.

As a result, the footrest pedal surface 4 is depressed on the toe's side in advance. Subsequently, the heel's side of the surface 4 is also deformed as if following the toe's side. That is, the frame member 7 is generally deformed so as to fall toward the front leg parts 9F and consequently, the footrest pedal surface 4 is shifted forward with respect to the lower frame part 10 of the frame member 7.

In this way, owing to the above-mentioned compressive deformation of the frame member 7, the collision energy is absorbed to moderate the impact applied on the passenger's sole and simultaneously, the foot F is moved obliquely upward of the toe board 2b.

Figure 7A:
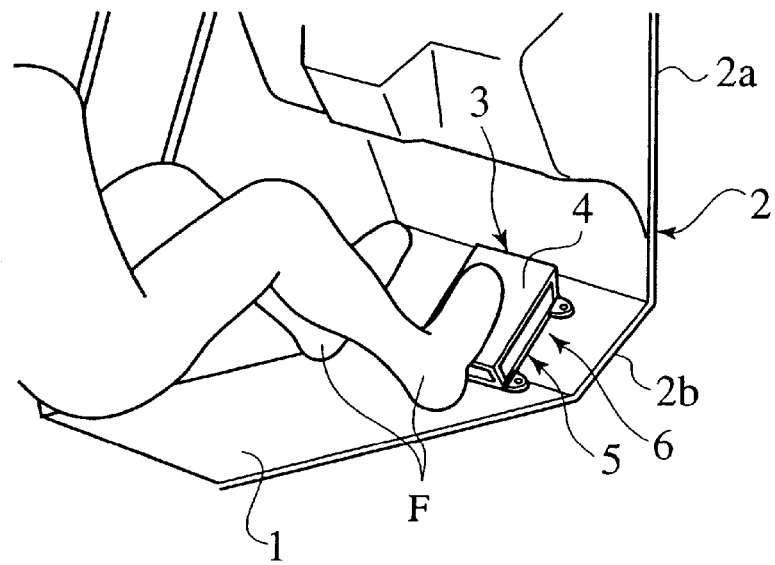
FIGS. 7A and 7B are explanatory views showing the operation of the footrest in accordance with the first embodiment of the invention, at the vehicle front collision.
Figure 7B:
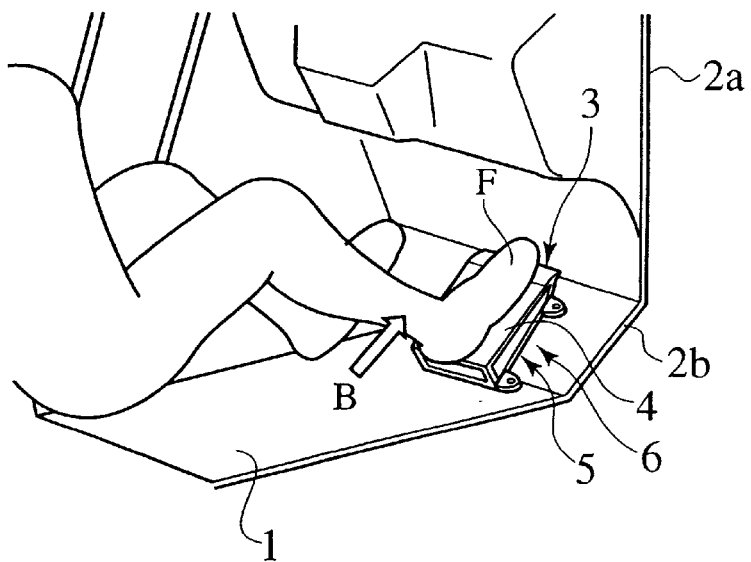

FIGS. 7A and 7B show the actions of the feet F of the passenger caused by the compressive deformation of the frame member 7, viewed obliquely from rearward of the passenger's room. For easiness of the explanation, each figure illustrates the footrest 3 arranged in a position corresponding to the right foot F of the passenger on an assistant driver's seat.

As mentioned above, when the frame member 7 is deformed so as to fall toward the leg parts 9F on the toe's side at the vehicle front collision, the foot F lying on the footrest pedal surface 4 moves from the position of FIG. 7A to the position of FIG. 7B obliquely upward of the toe board 2b, as shown with arrow B. As a result, the foot F moves against the deeper front upside of the foot space far from the front seat, so that the passenger's leg can be stretched.

Figure 8A:
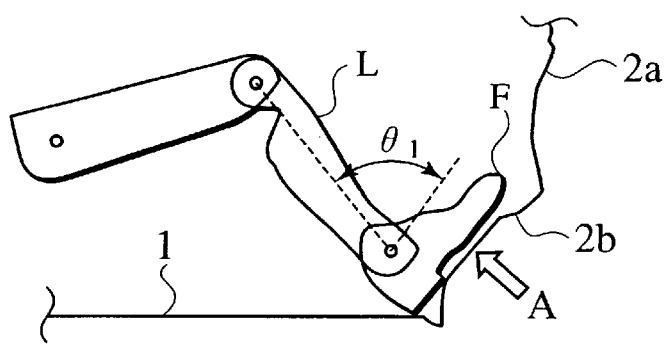
FIGS. 8A to 8D are explanatory views showing the relationship between the deformation of a toe board toward the passenger's room and the action of a passenger's foot model at the vehicle front collision.
Figure 8B:
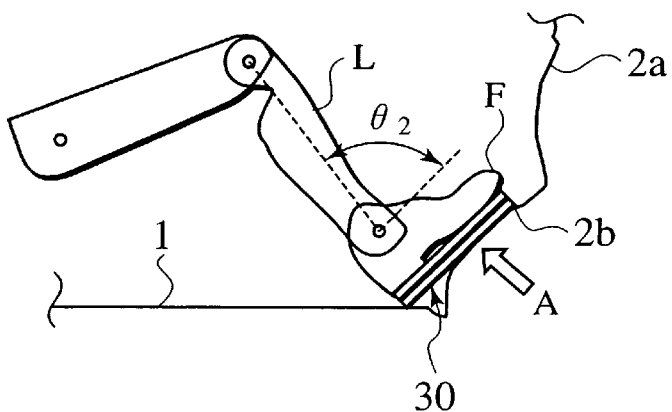
Figure 8C:
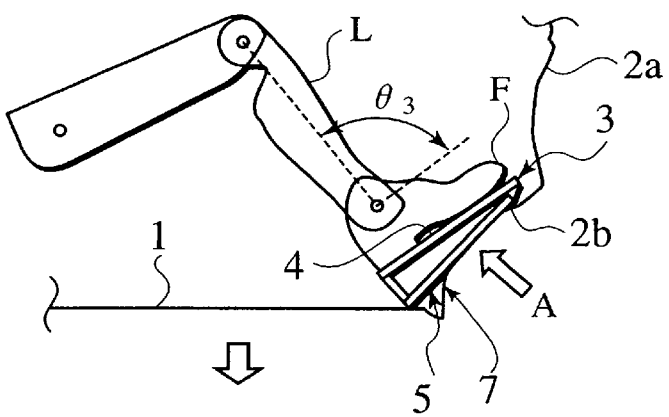
Figure 8D:
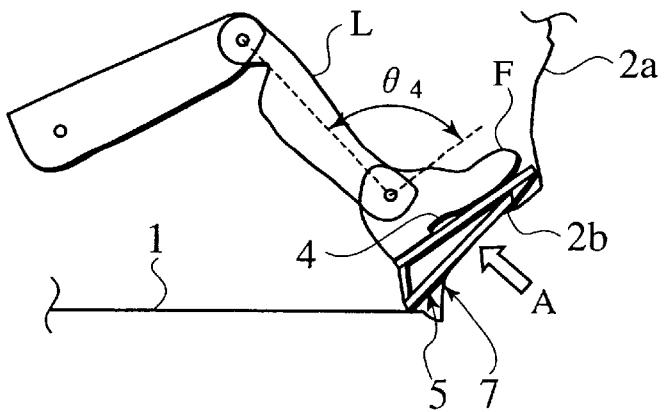

FIGS. 8A to 8D show the relationship between the deformation of the toe board 2b toward the passenger's room at the vehicle front collision and the actions of the passenger's foot F in models. In these figures, FIG. 8A shows a case of no footrest on the toe board 2b, while FIG. 8B shows a case that a footrest 30 on the toe board 2b is uniformly compressed to absorb the energy. Further, FIGS. 8C and 8D show respective conditions that the footrest 3 of the first embodiment is compressed from its toe's side to absorb the impact energy and the foot F is being displaced forward.

When the toe board 2b at the vehicle front collision is deformed toward the passenger's room in a direction of A, the passenger's legs are folded toward the hips by the retreat of the toe board 2b. Practically, there is also produced a forward movement of the passenger due to the inertia. Nevertheless, while standardizing the passenger's hips, FIGS. 8A to 8D illustrate sequent conditions where the toe board 2b is retreating relatively to the hips.

As shown in FIG. 8A, when the passenger lays his foot F on the toe board 2b directly, the folding of the passenger's legs due to the retreat of the toe board 2b causes the toe of the foot F to be bent backward with a pivotal movement of the joint of the passenger's ankle. Consequently, an angle between the foot F and the passenger's shin L is narrowed as shown by $\theta_1$ of FIG. 8A.

As shown in FIG. 8B, when the footrest 30 on the toe board 2b is compressed below the sole generally uniformly, the foot F is pressed excessively by the thickness of the so-buckled footrest 30 although the impact on the sole is moderated due to the collision energy absorbing action of the footrest 30. Therefore, the bending of the foot F is unavoidable despite that the angle between the foot F and the passenger's shin L is less narrowed than the previous case (FIG. 8A), as shown by $θ_2$ of FIG. 8B.

To the contrary, according to the embodiment, the retreat of the toe board 2b causes the toe's side of the frame member 7 to be compressively deformed in advance. As a result, the toe's side of the footrest pedal surface 4 is depressed forward, so that the angle between the foot F and the passenger's shin L is widened as shown by $θ_3$ of FIG. 8C. Subsequently, since the frame member 7 as a whole is deformed so as to fall toward the toe's side of the passenger, the impact on the sole is moderated due to the collision energy absorbing action of the frame member 7 being deformed in series and simultaneously, the passenger's foot F is moved obliquely upward of the toe board 2b thereby to stretch the passenger's leg footrest 30. In this way, the angle between the foot F and the passenger's shin L is increased from $θ_3$ (FIG. 8C) to $θ_4$ (FIG. 8D).

Figure 9:
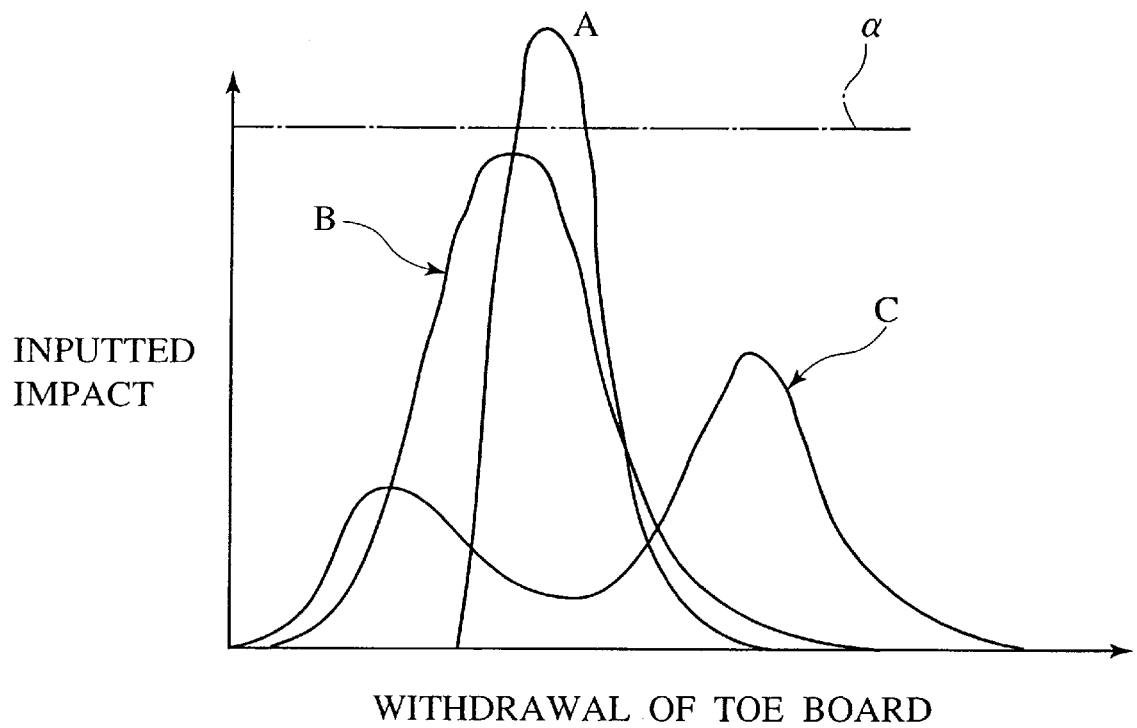
FIG. 9 is a graph showing the relationships between the impact and the withdrawal of the toe board, corresponding to the respective structures of FIGS. 8A to 8C.

FIG. 9 is a graph showing the change of an impact on the sole due to the action of the foot F. In FIG. 9, a line A designates the character corresponding to the structure of FIG. 8A, a line B does the character corresponding to the structure of FIG. 8B, and a line C designates the character corresponding to the structure of FIGS. 8C and 8D.

Comparing the line A with the line B, it will be understood that the structure having the footrest 30 is capable of reducing the impact on the sole in comparison with the structure having no footrest. Nevertheless, according to the embodiment, it is possible to reduce the magnitude of the impact as shown with the line C since it is divided into two stages corresponding to the initial deformation of the toe's side of the frame member 7 and the following deformation of the heel's side respectively. Furthermore, since the foot F moves to the direction to stretch the leg, the axis of the shin L is deviated from the direction of the so-inputted impact, whereby it is possible to lower the peak of load in comparison with an allowable burden α on the passenger's leg furthermore.

Figure 10:
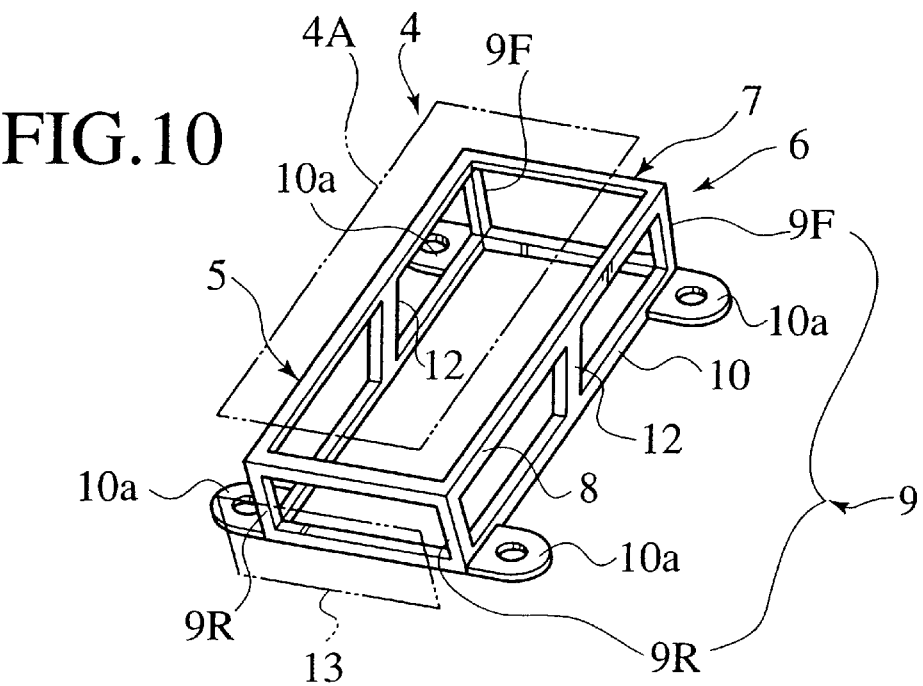
FIG. 10 is a perspective view of the energy absorbing unit of the second embodiment of the invention.
Figure 11:
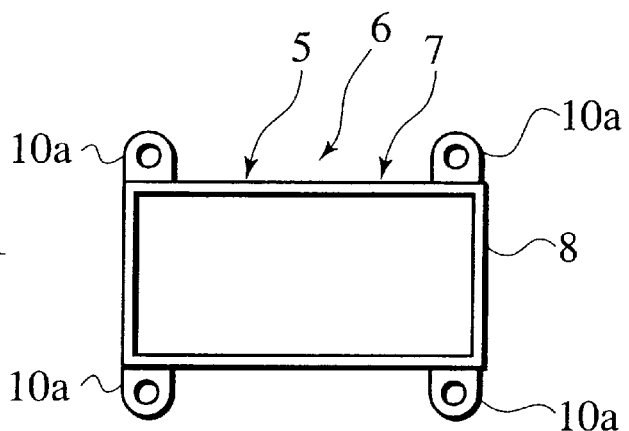
FIG. 11 is a plan view of the energy absorbing unit of FIG. 10.
Figure 12:
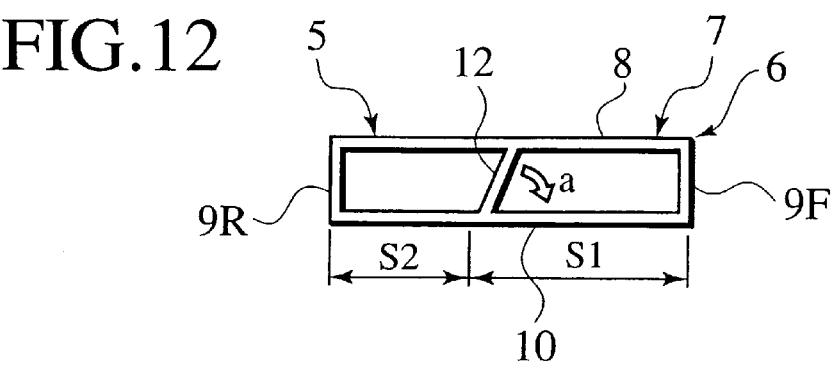
FIG. 12 is a side view of the energy absorbing unit of FIG. 10.

FIGS. 10 to 12 show the second embodiment of the present invention.

In this embodiment, both of the front leg parts 9F and the rear leg parts 9R of the frame member 7 forming the energy absorbing unit 5 are formed so as to be substantially perpendicular to the toe board 2b.

The frame member 7 is provided, between the leg parts 9F and the leg parts 9R, with intermediate leg parts 12 inclined forward to connect the upper frame part 8 with the lower frame part 10. Additionally, as a member for preventing the rear leg parts 9R, 9R from bending toward the toe's side, a plate 13 is welded on the left and right leg parts 9R, 9R and the upper and lower frame parts 8, 10 so as to promote the compressive deformation from the toe's side of the frame member 7, thereby forming the footrest moving mechanism 6.

Also in the second embodiment, when the toe board 2b is deformed toward the passenger's room by the vehicle front collision, the compressive deformation of the frame member 7 is initiated from the toe's side owing to the collapse of the intermediate leg parts 12 to the direction of arrow a of FIG. 12 and also the operation of the plate 13 to prevent the leg parts 9R from collapsing early. Subsequently, since the compressive deformation is transmitted to the whole frame member 7, it is possible to moderate the impact on the whole sole extending from the toe of the foot F to the heel. Simultaneously, since the foot F of the passenger is moved obliquely upward of the toe board 2b, it is possible to restrain the bending backward of the ankle. In this way, the footrest of the second embodiment has effects similar to those of the first embodiment.

Figure 13:
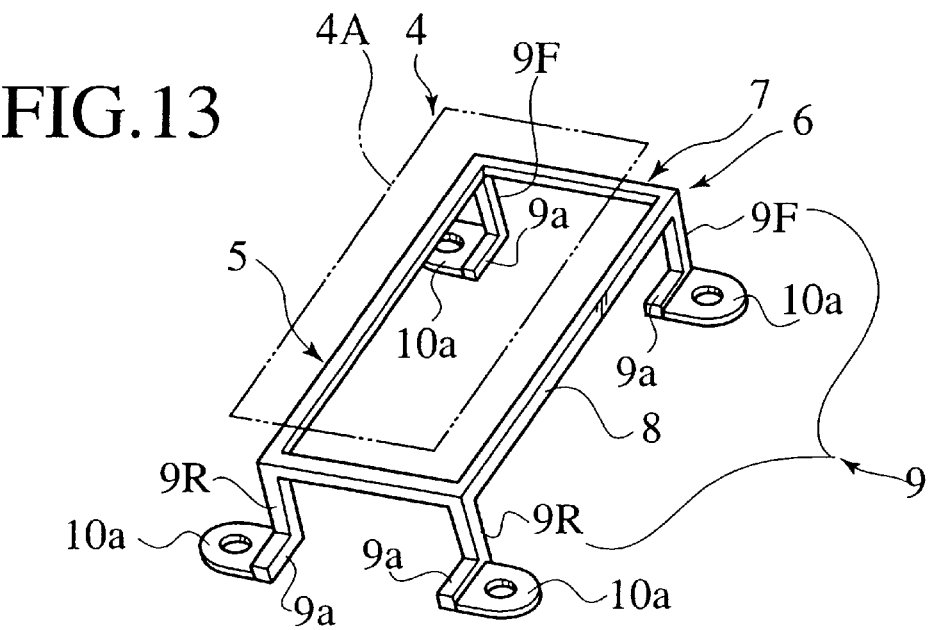
FIG. 13 is a perspective view of the energy absorbing unit of the third embodiment of the invention.
Figure 14:
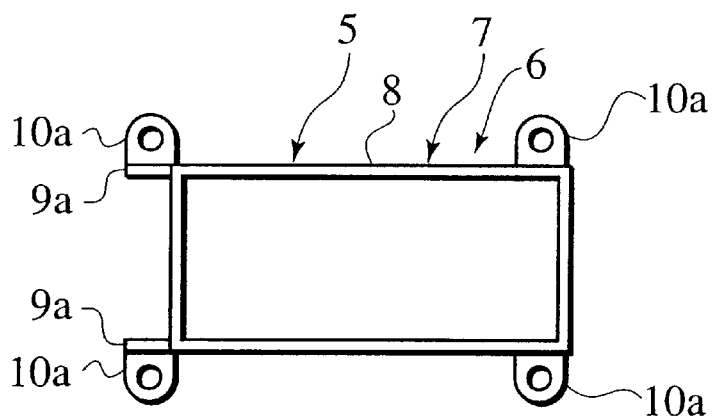
FIG. 14 is a plan view of the energy absorbing unit of FIG. 13.
Figure 15:
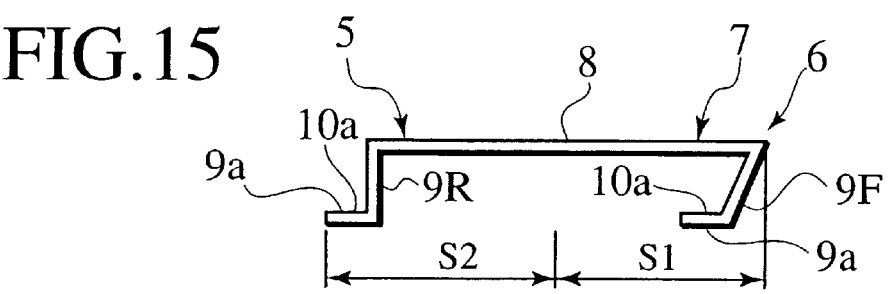
FIG. 15 is a side view of the energy absorbing unit of FIG. 13.

FIGS. 13 to 15 show the third embodiment of the invention. In the third embodiment, each leg part 9 has a bending part 9a formed to extend obliquely downward of the toe board 2b and a mount seat 10a formed outside the bending part 9a while eliminating the lower frame part 10 of the first embodiment.

Accordingly in the third embodiment, it is possible to exhibit similar effects to those of the first embodiment. Particularly, since each bending part 9a having the mount seat 10a points to the obliquely downward direction of the toe board 2b, the frame member 7 is apt to be deformed and moved obliquely upward of the toe board 2d at the compressive deformation, allowing the forward movement of the foot F to be carried out smoothly.

Figure 16:
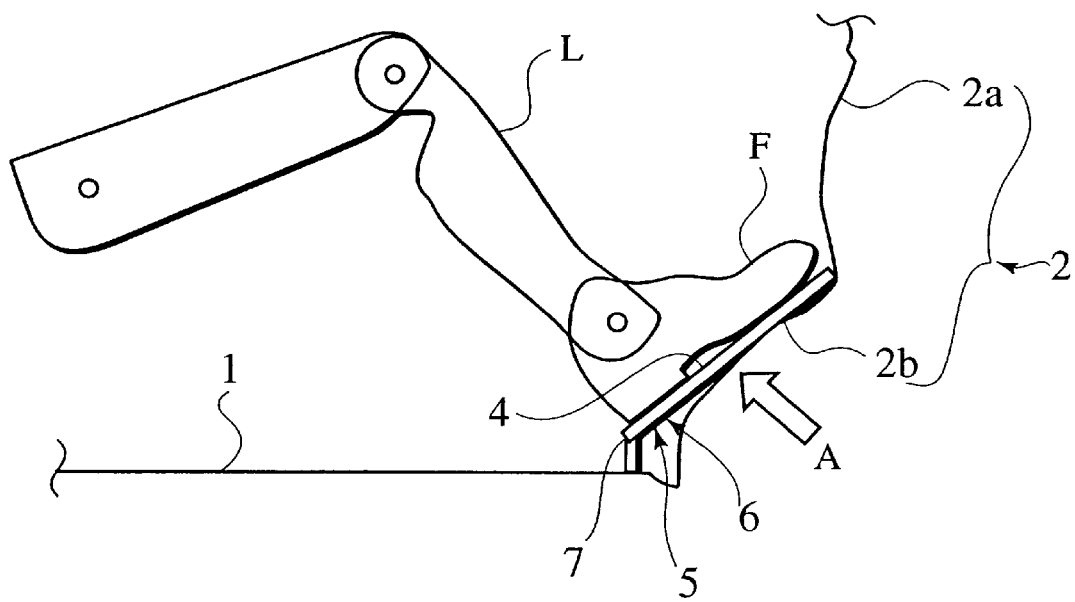
FIG. 16 is an explanatory view showing the relationship between the deformation of the toe board toward the passenger's room at the vehicle front collision and the action of the passenger's foot model, in accordance with the third embodiment of the invention.

Further, even if the toe board 2b is subjected to the above-mentioned local deformation, it is possible to absorb such the local deformation of the toe board 2b among the respective leg parts 9, as shown in FIG. 16.

Figure 17:
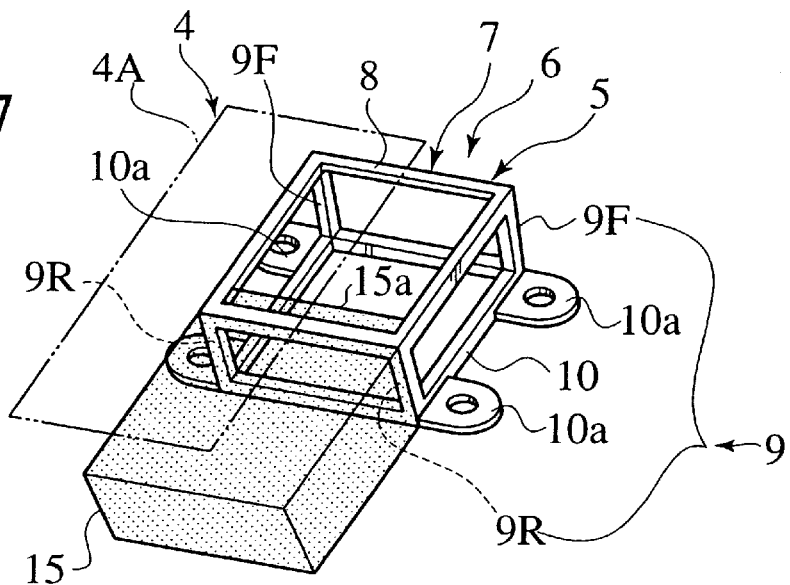
FIG. 17 is a perspective view of the energy absorbing unit of the fourth embodiment of the invention.
Figure 18:
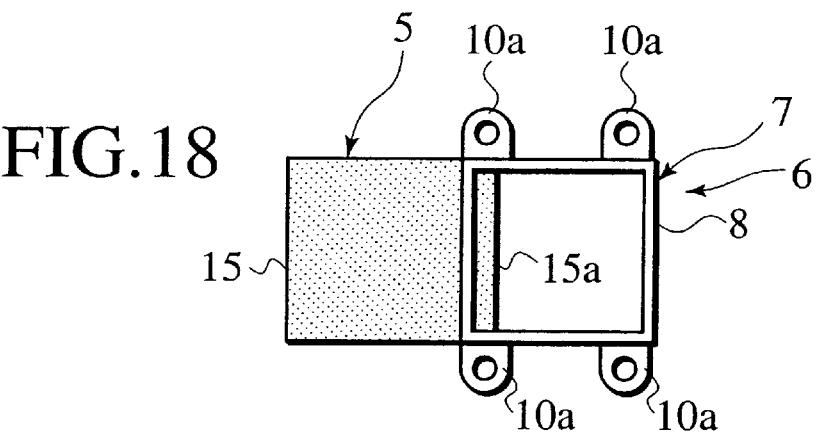
FIG. 18 is a plan view of the energy absorbing unit of FIG. 17.
Figure 19:
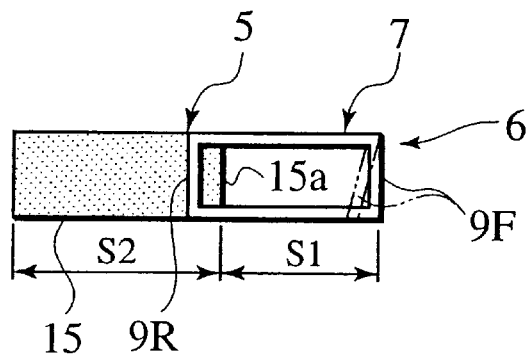
FIG. 19 is a side view of the energy absorbing unit of FIG. 17.

FIGS. 17 to 19 show the fourth embodiment of the present invention. In the embodiment, the energy absorbing unit 5 has the frame member 7 similar to that of the first embodiment, which is arranged on its generally-front part corresponding to the toe's side of the footrest 3, and a foaming member 15 of synthetic resin arranged on the generally-rear part corresponding to the heel's side of the footrest 3.

The foaming member 15 of synthetic resin is molded in the form of a square block. The member 15 is provided, on a front side thereof, with a small-sized part 15a which is fitted into the rear end of the frame member 7, in other words, an opening defined by the left and right leg parts 9R, 9R and the upper and lower frame parts 8, 10.

The rigidity of the frame member 7 is set to be smaller than that of the foaming member 15. In this way, since the energy absorbing unit 5 includes a soft area $S_1$ and a hard area $S_2$ established on the toe's side and the heel's side respectively, the energy absorbing unit 5 per se can form the footrest moving mechanism 6 in this embodiment.

Although the front leg parts 9F of the frame member 7 are formed so as to be substantially perpendicular to the toe board 2b in the same way as the rear leg parts 9R in this embodiment, they may be inclined forward as shown with broken lines of FIG. 19, similarly to the first embodiment.

Also in the fourth embodiment, when the toe board 2b is deformed toward the passenger's room by the vehicle front collision, the compressive deformation is initiated from the toe's side of the frame member 7 and subsequently, the foaming member 15 on the heel's side is deformed compressively. Consequently, it is possible to moderate the impact on the whole sole extending from the toe of the foot F to the heel. Simultaneously, since the foot F of the passenger is moved obliquely upward of the toe board 2b, it is possible to restrain the bending backward of the ankle. In this way, the footrest of the fourth embodiment also has effects similar to those of the first embodiment.

Figure 20:
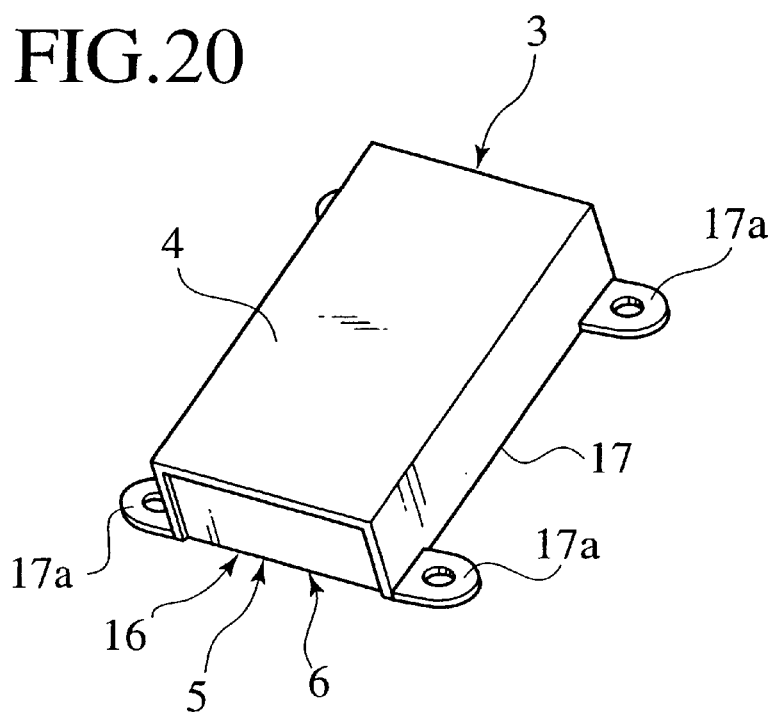
FIG. 20 is a perspective view showing the fifth embodiment of the invention.
Figure 21:
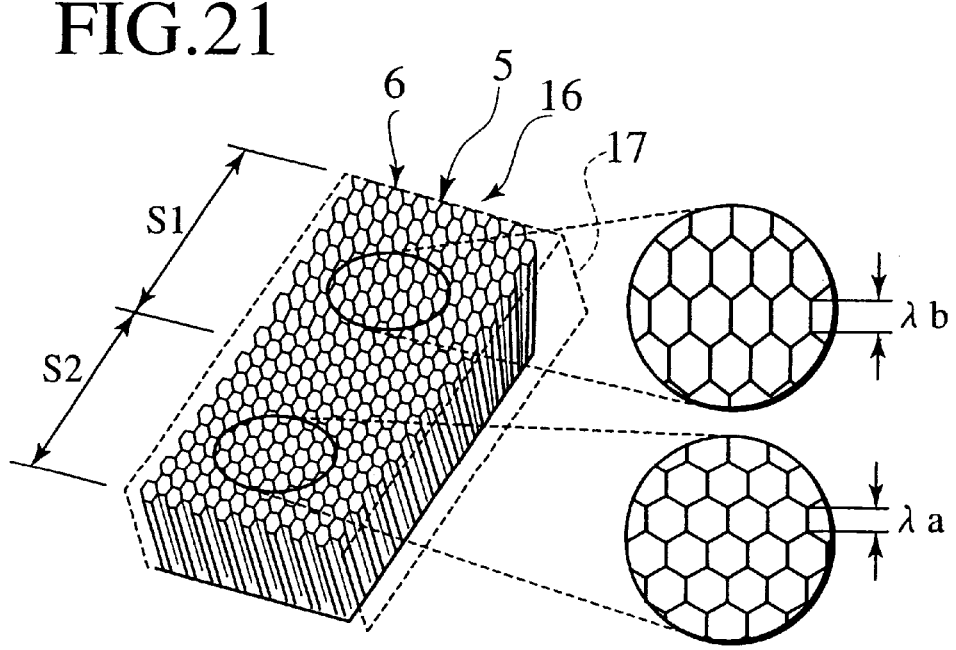
FIG. 21 is a perspective view of the energy absorbing unit of the fifth embodiment of the invention.
Figure 22A:
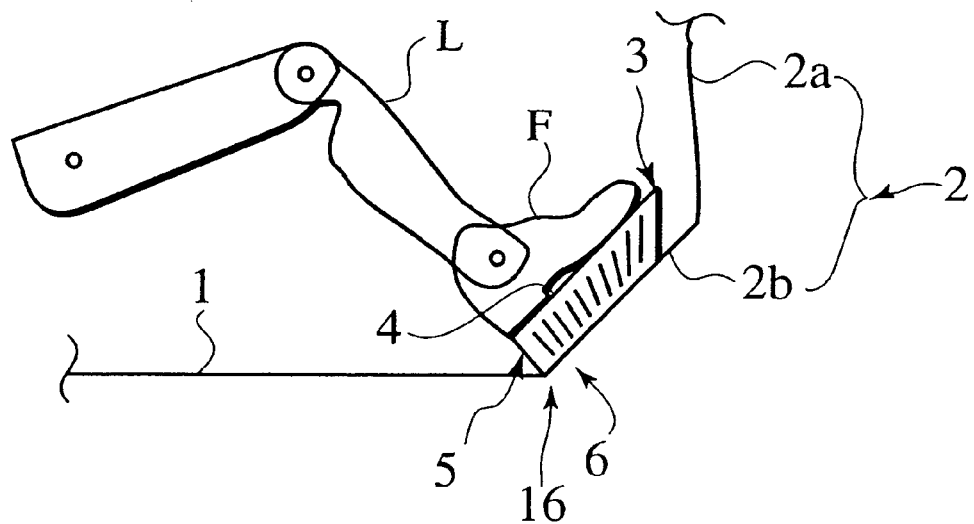
FIGS. 22A and 22B are explanatory views showing the relationship between the deformation of the toe board toward the passenger's room at the vehicle front collision and the action of the passenger's foot model, in accordance with the fifth embodiment of the invention.
Figure 22B:
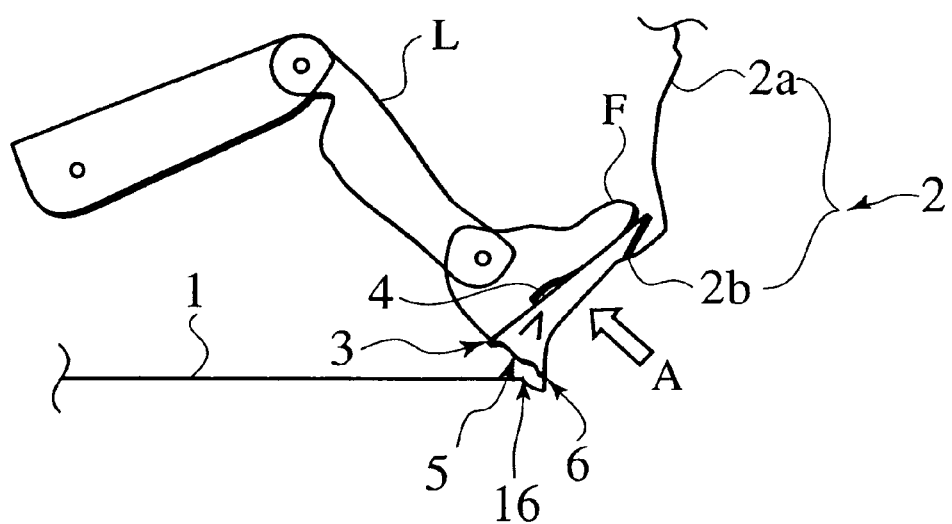

FIGS. 20 and 21 show the fifth embodiment of the present invention. In this embodiment, the energy absorbing unit 5 has a honeycomb member 16 including a plurality of cells arranged along a direction that respective axes of the cells cross the footrest pedal surface 4.

In order to allow the deformation of the honeycomb member 16 to be initiated on the toe's side of the footrest pedal surface 4, the honeycomb member 16 includes the soft area $S_1$ and the hard area $S_2$ established on the toe's side and the heel's side respectively. In this way, the honeycomb member 16 per se can form the footrest moving mechanism 6 in this embodiment.

As to the establishment of the areas $S_1$ and $S_2$, they can be optionally established by changing the material of the member 16, the wall thickness of a cell, the diameter of a cell, the density of cells, etc. According to the embodiment, as shown in FIG. 21, the cells on the generally-front side of the honeycomb member 16 are partially stretched, only on their upper portions, so that each diameter $\lambda_b$ of the cells gradually increases along a fore-and-aft direction of the vehicle as they approach toward the front end of the member 16, which is different from each diameter $\lambda_a$ of the cells on the generally-rear side of the honeycomb member 16. In this way, since the cells are formed so as to have their axes stooped gradually, the honeycomb member 16 is provided, on the toe's side and the heel's side, with the soft area $S_1$ and the hard area $S_2$ respectively, thereby forming the footrest moving mechanism 6.

The footrest pedal surface 4 is defined by a cover plate 17 for covering the top face of the honeycomb member 16 and likewise its left and right side faces. The cover plate 17 has mount seats 17a formed on both sidewalls, for fixing the plate 17 on the toe board 2b. As a matter of course, the cover plate 17 is formed with a rigidity that would not influence on the collision energy absorbing action of the honeycomb member 16 to be compressively deformed.

Also in the fifth embodiment, when the toe board 2b is deformed toward the passenger's room by the vehicle front collision, the forward collapse is initiated from the toe's side (area $S_1$) of the honeycomb member 16 and subsequently, the remaining heel's side (area $S_2$) of the honeycomb member 16 is also collapsed to absorb the collision energy. Consequently, it is possible to moderate the impact on the whole sole extending from the toe of the foot F to the heel. Simultaneously, since the foot F of the passenger is moved obliquely upward of the toe board 2b, it is possible to restrain the bending backward of the ankle. In this way, the footrest of the fifth embodiment also has effects similar to those of the first embodiment.

Figure 23:
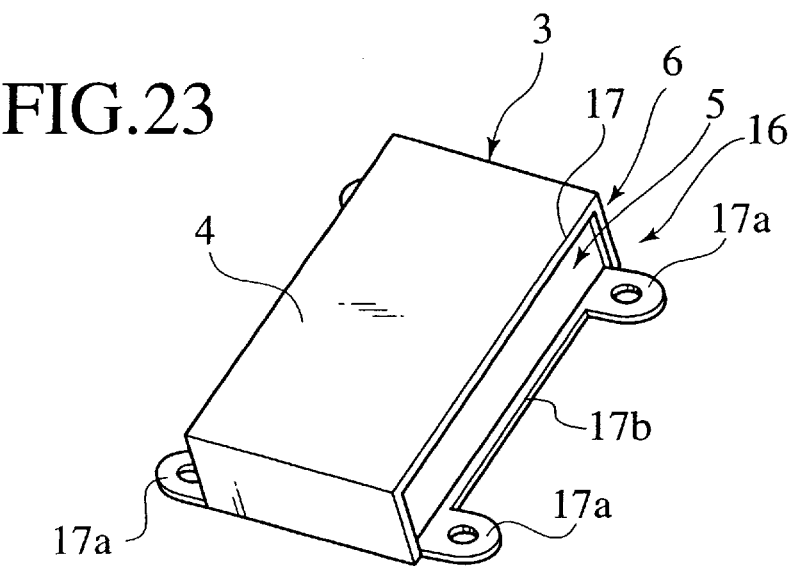
FIG. 23 is a perspective view showing the sixth embodiment of the invention.
Figure 24:
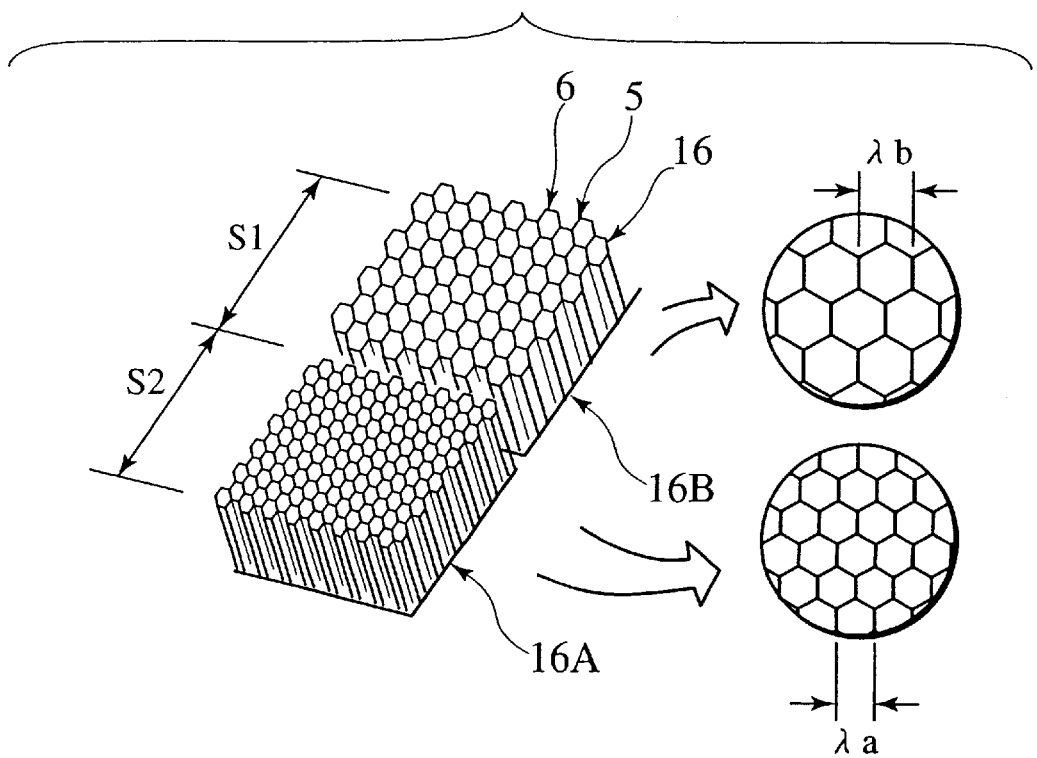
FIG. 24 is a perspective view of the energy absorbing unit of the sixth embodiment of the invention.
Figure 25:
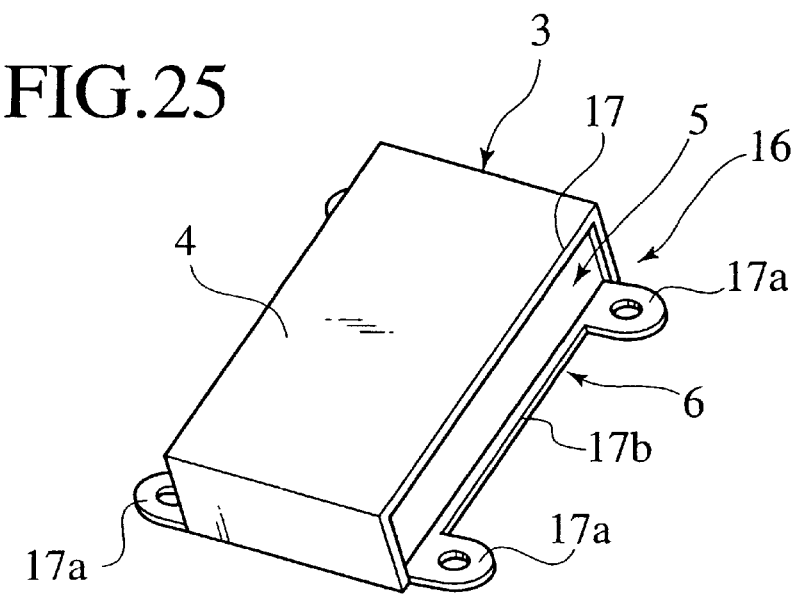
FIG. 25 is a perspective view showing the seventh embodiment of the invention.
Figure 26:
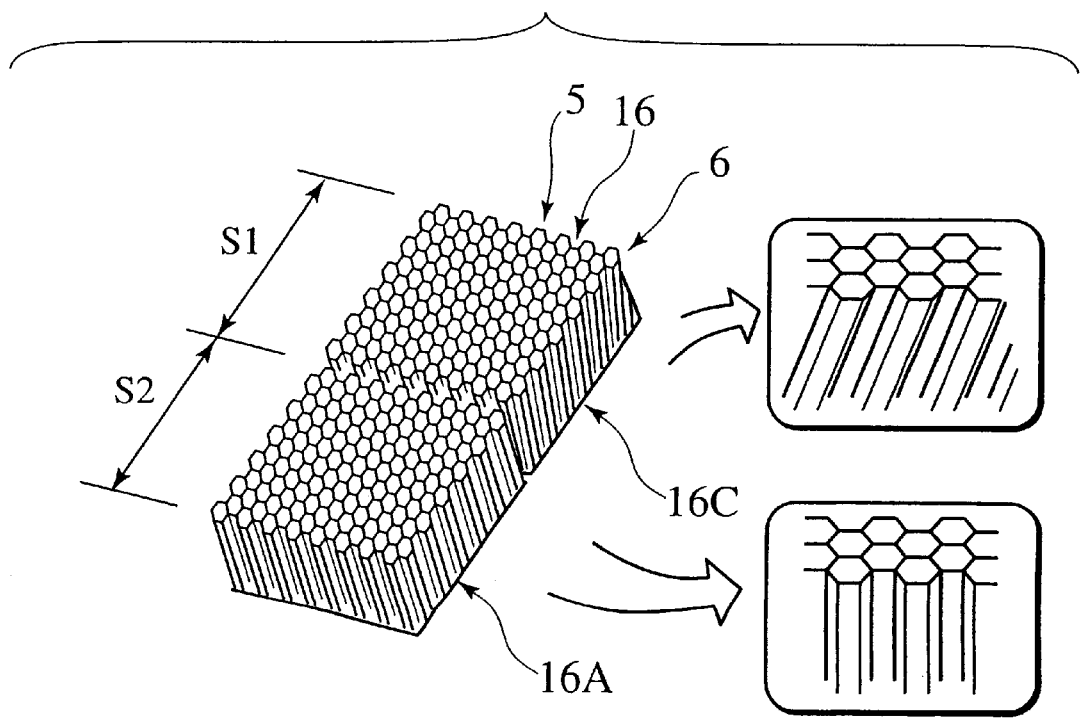
FIG. 26 is a perspective view of the energy absorbing unit of the seventh embodiment of the invention.

In the modifications of the honeycomb member 16 forming the energy absorbing unit 5, FIGS. 23 and 24 show the sixth embodiment, while FIGS. 25 and 26 show the seventh embodiment of the present invention.

According to the sixth embodiment, the honeycomb member 16 comprises a honeycomb member 16A having a high density of cells to establish the hard area $S_2$ and a honeycomb member 16B having a low density of cells to establish the soft area $S_1$. In order to attain such the densities of cells, each diameter $\lambda_b$ of the cells on the toe's side is set to be larger than each diameter $\lambda_a$ of the cells on the heel's side of the honeycomb member 16. In this way, the honeycomb member 16 per se can form the footrest moving mechanism 6 in this embodiment.

According to the seven embodiment, the honeycomb member 16 comprises the honeycomb member 16A formed with cells' axes generally perpendicular to the toe board 2b l to establish the hard area $S_2$ and a honeycomb member 16C formed with cells'axes inclined against the toe's side to establish the soft area $S_1$. Thus, also in this embodiment, the honeycomb member 16 per se constitutes the footrest moving mechanism 6.

In common with the sixth and seventh embodiments, the cover plate 17 providing the footrest pedal surface 4 is formed so as to cover the top face of the honeycomb member 16 and likewise its front and rear faces. The cover plate 17 has additional frame parts 17b formed to connect a front wall of the plate 17 with the rear wall. In the embodiment, the mount seats 17a are formed so as to extend from respective side edge of the frame parts 17b. With the above-mentioned formation, the cover plate 17 is constructed so as to be easy to be buckled following to the forward collapse of the honeycomb member 16 at the compressive deformation.

Commonly, when the toe board 2b is deformed toward the passenger's room by the vehicle front collision, the forward collapse is initiated from the toe's side (area $S_1$) of the honeycomb member 16 and subsequently, the forward collapse is transmitted to the remaining heel's side (area $S_2$) of the honeycomb member 16. Consequently, it is possible to moderate the impact on the whole sole extending from the toe of the foot F to the heel. Simultaneously, since the foot F of the passenger is moved obliquely upward of the toe board 2b, it is possible to restrain the bending backward of the ankle. In this way, the footrests of the sixth and seventh embodiments also have effects similar to those of the fifth embodiment.

Figure 27:
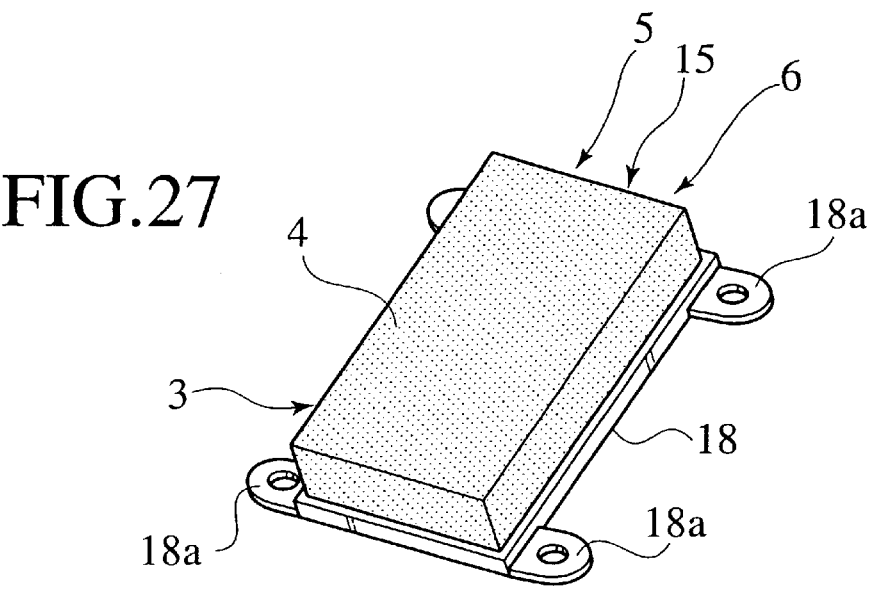
FIG. 27 is a perspective view showing the eighth embodiment of the invention.
Figure 28:
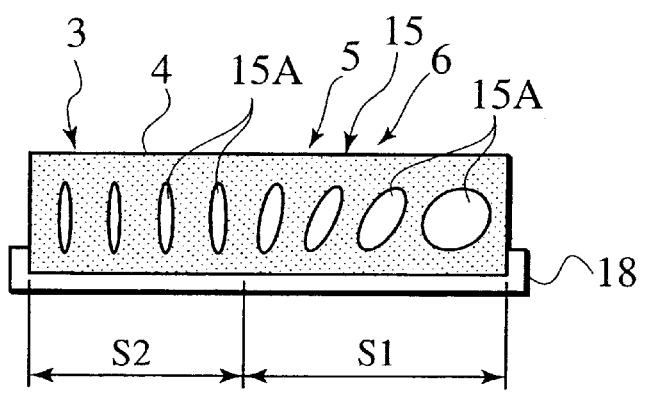
FIG. 28 is an explanatory sectional view of the eighth embodiment of the invention.
Figure 29:
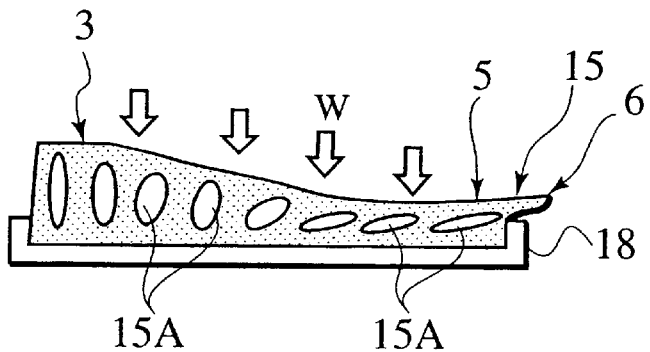
FIG. 29 is an explanatory sectional view showing the operation of the compressed energy absorbing unit of FIG. 28.

FIGS. 27 to 29 show the eighth embodiment of the present invention. In this embodiment, the synthetic resinous foaming member 15 in the form of an oblong block forms the energy absorbing unit 15.

The foaming member 15 has the soft area SI established on the toe's side of the footrest pedal surface 4 and the hard area $S_2$ established on the heel's side of the surface 4 in order to allow the compressive deformation of the member 15 to be initiated at its part corresponding to the toe's side of the footrest pedal surface 4. The so-formed foaming member 15 itself forms the footrest moving mechanism 6 of the embodiment.

The above establishment of the foaming member 15 is attained by altering a material for the member 15, its elastic coefficient, etc. optionally. While, in the shown embodiment, the foaming member 15 is provided, inside thereof, with a plurality of orifices 15A arranged from the heel's side to the toe's side. Further, the orifices 15A on the toe's side are shaped larger than those on the heel's side, providing the soft area $S_1$ on the toe's side while providing the hard area $S_2$ on the heel's side. Owing to the formation of the member 15, the compressive deformation of the member 15 can be started on the toe's side and transmitted to the heel's side continuously, thereby forming the footrest moving mechanism 6.

Generally, each orifice 15A is shaped in the form of a vertically-elongated hole. These elongated holes are formed so as to be gradually inclined forward as they approaches the toe's side, allowing the above compressive deformation of the member 15 to be accompanied with its collapsing forward.

The foaming member 15 is secured on a retainer plate 18 in the form of a tray. The retainer plate 18 is fastened to the toe board 2b through mount seats 18a formed on left and right margins of the tray.

Although the top face of the member 15 forms the footrest pedal surface 4 in the shown embodiment, the surface 4 may be formed by the flat plate 4A of the first embodiment or the cover plate 17 of the sixth embodiment, of course.

Therefore, according to the eighth embodiment, when the toe board 2b is deformed toward the passenger's room by the vehicle front collision, a compression load W is applied on the foaming member 15 forming the energy absorbing unit 5, as shown in FIG. 29. Consequently, the forward collapse is initiated from the toe's side of the foaming member 15 and subsequently, the forward collapse is transmitted to the remaining heel's side of the member 15, whereby it is possible to moderate the impact on the whole sole extending from the toe of the foot F to the heel. Simultaneously, since the foot F of the passenger is moved obliquely upward of the toe board 2b, it is possible to restrain the bending backward of the ankle. In this way, the footrest of the eighth embodiment also has effects similar to those of the first embodiment.

Figure 30:
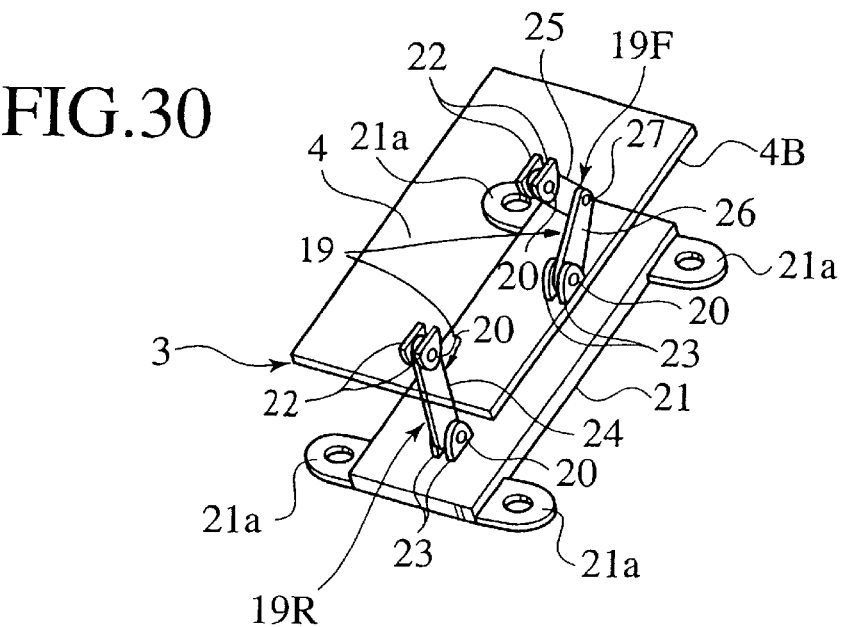
FIG. 30 is a transparent perspective view showing the ninth embodiment of the invention.
Figure 31:
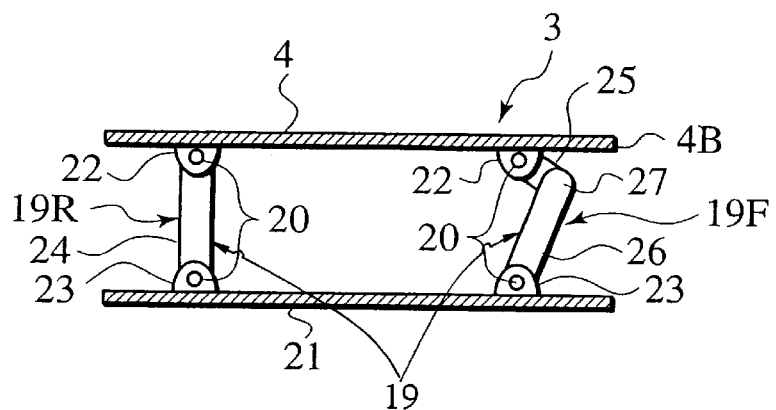
FIG. 31 is an explanatory sectional view of the ninth embodiment of the invention.
Figure 32:
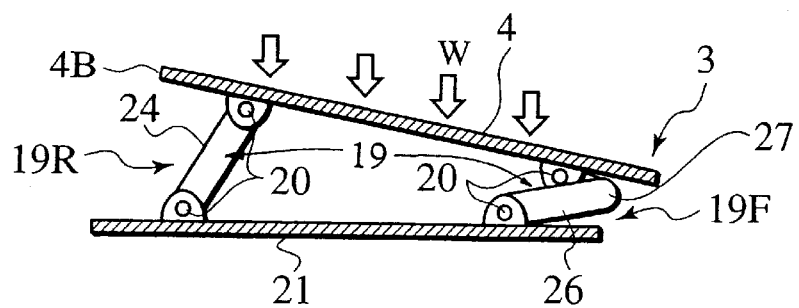
FIG. 32 is an explanatory sectional view showing the operation of the compressed energy absorbing unit of FIG. 31.

FIGS. 30 to 32 show the ninth embodiment of the present invention. In this embodiment, the energy absorbing unit 5 comprises a link mechanism 19 adapted so as to be folded with a required resistance in each pin joint 20 as the rotating part of the mechanism 19. The required resistance may be provided by adjusting the rotating friction about the pin joint 20.

The link mechanism 19 has a linking unit 19F on the toe's side and another linking unit 19R on the heel's side, both of which are arranged between a flat plate 4B forming the footrest pedal surface 4 and a base plate 21 fastened to the toe board 2b through mount seats 21a.

The linking unit 19R on the heel's side F has a single link 24 connecting one bracket 22 on the flat plate 4B with one bracket 23 on the base plate 21, while the linking unit 19F on the toe's side has an upper short link 25 linked to another bracket 22 on the flat plate 4B and a lower long link 26 linked to another bracket 23. At a pin joint 27, the short link 25 and the long link 26 are jointed to each other in a V-shaped form at a predetermined angle so that the flat plate 4B is parallel with the base plate 21. In this way, the degree of folding of the linking unit 19F on the toe's side is established larger than that of the linking unit 19R on the heel's side, so that the link mechanism 19 per se forms the footrest moving mechanism 6 of this embodiment.

Although each pin joint (rotational element) 20 of the linking unit 19R on the heel's side may have a rotational resistance generally equal to that of each pin joint (rotational element) 20, 27 of the linking unit 19F on the toe's side, it is also preferable to establish the friction of the pin joint 20, 27 of the linking unit 19F to be somewhat smaller than that of the linking unit 19R in view of allowing the folding of the linking unit 19F to precede the folding of the linking unit 19R.

Therefore, according to the ninth embodiment, when the toe board 2b is deformed toward the passenger's room by the vehicle front collision, the compression load W is applied on the footrest pedal surface 4, so that both of the linking units 19F, 19R are folded as shown in FIG. 32. By the rotational friction of the pin joints 20, 27 of the linking unit 19F and also the rotational friction of the pin joints 20 of the linking unit 19R during this folding operation, the collision energy can be absorbed to moderate the impact on the whole sole of the passenger.

In the linking unit 19F on the toe's side, the short link 25 and the long link 26 are bent in substantial V-shaped manner to provide the pin joint 27 as an inside folding point. Therefore, the degree of folding of the linking unit 19F becomes larger than that of the linking unit 19R, so that the footrest pedal surface 4 sinks greatly and moves forward to allow the passenger's foot F to move obliquely upward of the toe board 2b.

As a result, it is possible to restrain the bending backward of the ankle of the foot F on the footrest pedal surface 4 and the footrest of the ninth embodiment also has effects similar to those of the first embodiment.

Figure 33:
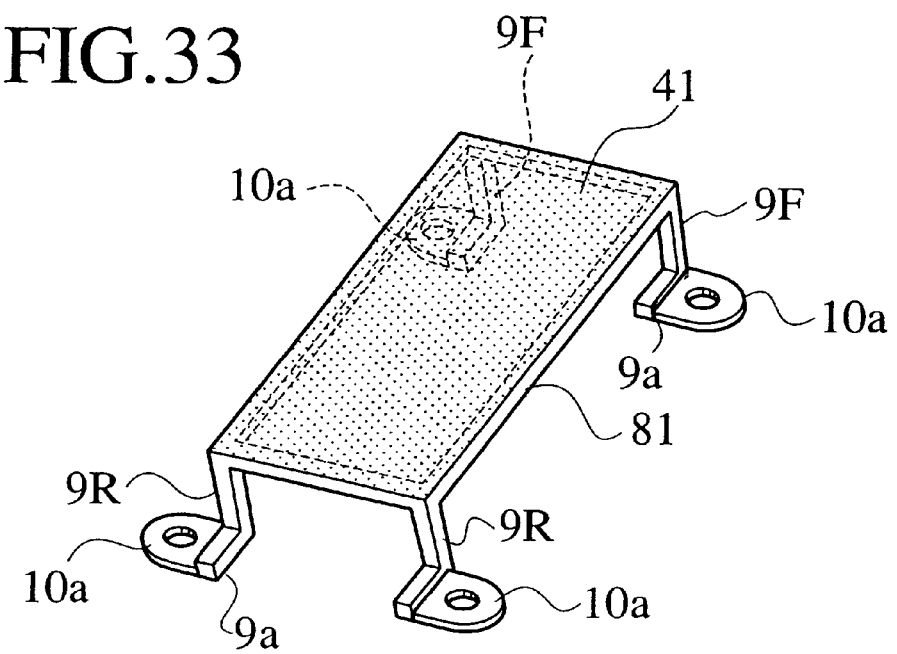
FIG. 33 is a perspective view showing a modification of the first embodiment of the invention.
Figure 34:
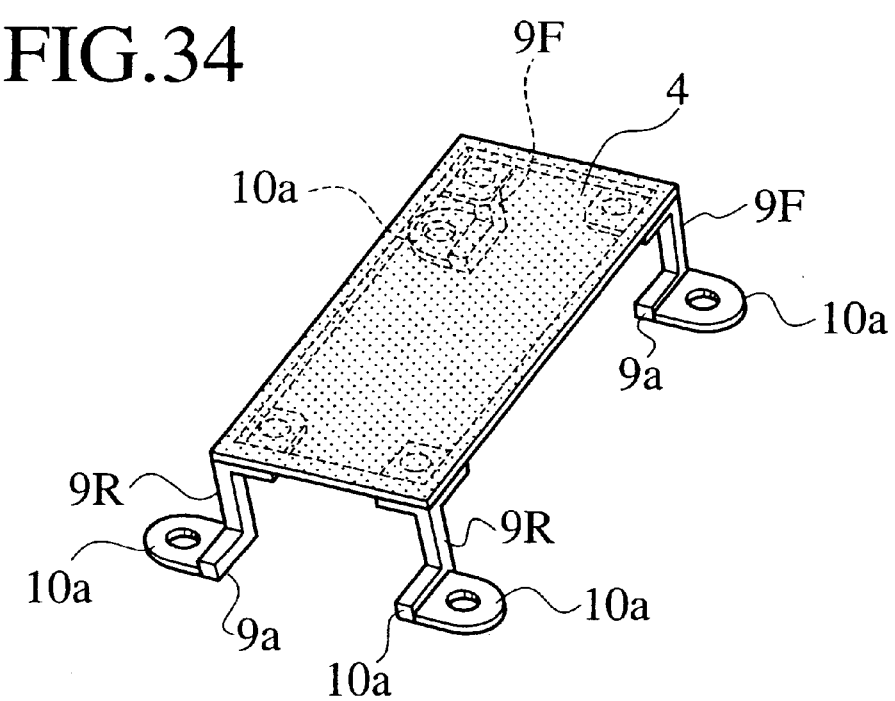
FIG. 34 is a perspective view showing another modification of the first embodiment of the invention.

In the modification of the first embodiment, upon deleting the frame part as shown in FIG. 33, a footrest pedal surface 41 may includes an additional function of leg parts although the footrest 3 of the first embodiment is provided with the frame part 10. Alternatively, as shown in FIG. 34, different bodies may form the leg parts 9F and the footrest pedal surface 4, respectively.

The entire contents of Japanese Patent Application No. 11-349452 (filed on Dec. 8, 1999) is incorporated herein by reference.

The scope of the invention is defined with reference to the following claims.

What is claimed is:

1. A footrest for a passenger in a vehicle, comprising:
   a floor panel forming an under side of a vehicle passenger's room;
   a dash panel forming a front side of the passenger's room and continuously connects to the floor panel;
   a toe board formed on an underside of the dash panel;
   a footrest pedal formed on the toe board having a surface for resting a passenger's foot;
   an energy absorbing unit which is compressively deformed to absorb a collision energy when the toe board is deformed toward a passenger's room in a vehicle front collision; and
   a footrest moving mechanism for moving the passenger's foot lying on the footrest pedal surface, obliquely upward of the toe board simultaneously with the absorption of the collision energy by the energy absorbing unit.

2. The footrest of claim 1, wherein
the energy absorbing unit includes a frame member having a rectangular part forming the footrest pedal surface, the rectangular part being generally rectangular in plan view, and leg parts extending from four corners of the rectangular part toward the toe board.

3. The footrest of claim 2, wherein
the footrest moving mechanism comprises the frame member further including intermediate leg parts arranged between the leg parts on a toe's side and the leg parts on a heel's side, the intermediate leg parts being inclined forward, and a deformation restraining member for restraining the leg parts on the heel's side from collapsing forward, whereby the compressive deformation of the frame member is facilitated from the toe's side of the frame member.

4. The footrest of claim 1, wherein
the energy absorbing unit includes a honeycomb member having a plurality of cells formed along a direction so that respective axes thereof cross the footrest pedal surface.

5. The footrest of claim 4, wherein
the footrest moving mechanism comprises the honeycomb member which is formed so that each diameter of the cells on a toe's side is larger than each diameter of the cells on a heel's side, whereby the compressive deformation is facilitated from the toe's side of the frame member.

6. The footrest of claim 5, wherein the cells on the toe's side of the honeycomb member are inclined forward.

7. The footrest of claim 1, wherein
the energy absorbing unit has a foaming member of synthetic resin.

8. The footrest of claim 7, wherein
the footrest moving mechanism comprises the foaming member which contains a plurality of orifices where the orifices on a toe's side are shaped larger than the orifices on a heel's side, whereby the compressive deformation is facilitated from the toe's side of the frame member.

9. The footrest of claim 8, wherein the orifices comprise vertically-elongated holes which are formed so as to be gradually inclined forward as they approach the toe's side.

10. The footrest of claim 1, wherein
the energy absorbing unit comprises a link mechanism capable of folding with a predetermined friction in rotating elements thereof.

11. The footrest of claim 10, wherein the link mechanism has a plurality of linking units.

12. The footrest of claim 11, wherein the footrest moving mechanism comprises a linking unit on a toe's side having an inside folding point formed to allow a degree of folding of the linking unit on the toe's side to be larger than a degree of folding of a linking unit on a heel's side.

13. The footrest of claim 1, wherein
the footrest moving mechanism comprises the energy absorbing unit having a soft area arranged on a toe's side thereof and a hard area arranged on a heel's side thereof, whereby the compressive deformation of the energy absorbing unit is started from the toe's side of the footrest pedal surface.

14. The footrest of claim 1, further comprising a nonskid mechanism arranged on the footrest pedal surface to prevent the passenger's foot from slipping on the footrest pedal surface.

15. The footrest of claim 1, wherein the footrest is formed to have a width allowing both feet of the passenger to be mounted on the footrest pedal surface.

16. The footrest of claim 2, wherein
the footrest moving mechanism comprises the frame member having the leg parts on a toe's side inclined forward, whereby the compressive deformation of the frame member is facilitated from the toe's side of the frame member.

17. A footrest for a passenger in a vehicle, comprising:

a floor panel forming an under side of a vehicle passenger's room;

a dash panel forming a front side of the passenger's room and continuously connects to the floor panel;

a toe board formed on an underside of the dash panel; a footrest pedal formed on the toe board having a surface for resting a passenger's foot;

energy absorbing means which is compressively deformed to absorb a collision energy when the toe board is deformed toward a passenger's room in a vehicle front collision; and footrest moving means for moving the passenger's foot lying on the footrest pedal surface, obliquely upward of the toe board simultaneously with the absorption of the collision energy by the energy absorbing means.

* * * * *